(12) United States Patent
Hao et al.

(10) Patent No.: US 9,280,612 B2
(45) Date of Patent: Mar. 8, 2016

(54) VISUALIZING A RELATIONSHIP OF ATTRIBUTES USING A RELEVANCE DETERMINATION PROCESS TO SELECT FROM CANDIDATE ATTRIBUTE VALUES

(71) Applicant: HEWLETT-PACKARD DEVELOPMENT COMPANY, L.P., Houston, TX (US)

(72) Inventors: Ming C. Hao, Palo Alto, CA (US); Sebastian Mittelstaedt, Constance (DE); Umeshwar Dayal, Saratoga, CA (US); Meichun Hsu, Los Altos Hills, CA (US); Daniel Keim, Steisslingen (DE)

(73) Assignee: Hewlett Packard Enterprise Development LP, Houston, TX (US)

( * ) Notice: Subject to any disclaimer, the term of this patent is extended or adjusted under 35 U.S.C. 154(b) by 366 days.

(21) Appl. No.: 13/714,871

(22) Filed: Dec. 14, 2012

(65) Prior Publication Data

US 2014/0172861 A1    Jun. 19, 2014

(51) Int. Cl.
  *G06F 17/30* (2006.01)
(52) U.S. Cl.
  CPC .... *G06F 17/30994* (2013.01); *G06F 17/30598* (2013.01)
(58) Field of Classification Search
  CPC ............... G06F 17/30598; G06F 17/30864
  USPC ................................................. 707/737, 740
  See application file for complete search history.

(56) References Cited

U.S. PATENT DOCUMENTS

| | | | |
|---|---|---|---|
| 3,487,308 A | 12/1969 | Johnson | |
| 5,581,797 A | 12/1996 | Baker | |
| 5,608,904 A | 3/1997 | Chaudhurietal | |
| 5,623,590 A | 4/1997 | Becker | |
| 5,623,598 A | 4/1997 | Voigt | |
| 5,634,133 A | 5/1997 | Kelley | |
| 5,659,768 A | 8/1997 | Forbes et al. | |
| 5,694,591 A | 12/1997 | Duetal | |
| 5,757,356 A | 5/1998 | Takasaki et al. | |
| 5,801,688 A | 9/1998 | Mead et al. | |

(Continued)

FOREIGN PATENT DOCUMENTS

EP        0778001        11/1997

OTHER PUBLICATIONS

Christopher Ahlberg et al., Dynamic Queries for Information Exploration: An Implementation and Evaluation, May 3-7, 1992, ACM, 619-626.*

(Continued)

*Primary Examiner* — Jean B Fleurantin
(74) *Attorney, Agent, or Firm* — Hewlett Packard Enterprise Development LP

(57) ABSTRACT

For plural categorical values of a first attribute, more relevant categorical values of a second attribute are selected from among candidate categorical values of the second attribute, where the selecting uses a relevance determination process that considers frequencies of occurrence of respective pairs of the categorical values of the first and second attributes. A visualization that includes groups of cells corresponding to the respective pairs of categorical values of the first and second attributes is generated. At least one of the groups includes cells assigned visual indicators based on values of a third attribute.

20 Claims, 6 Drawing Sheets
(3 of 6 Drawing Sheet(s) Filed in Color)

(56) References Cited

U.S. PATENT DOCUMENTS

| | | | |
|---|---|---|---|
| 5,878,206 | A | 3/1999 | Chenetal |
| 5,903,891 | A | 5/1999 | Chenetal |
| 5,924,103 | A | 7/1999 | Ahmed et al. |
| 5,929,863 | A | 7/1999 | Tabei et al. |
| 5,940,839 | A | 8/1999 | Chen et al. |
| 5,953,006 | A | 9/1999 | Baker |
| 5,986,673 | A | 11/1999 | Martz |
| 5,999,192 | A | 12/1999 | Selfridge |
| 5,999,193 | A | 12/1999 | Conley, Jr. |
| 6,052,890 | A | 4/2000 | Malagrino, Jr. et al. |
| 6,144,379 | A | 11/2000 | Bertram et al. |
| 6,188,403 | B1 | 2/2001 | Sacerdoti |
| 6,211,880 | B1 | 4/2001 | Impink, Jr. |
| 6,211,887 | B1 | 4/2001 | Meier et al. |
| 6,269,325 | B1 | 7/2001 | Lee et al. |
| 6,373,483 | B1 | 4/2002 | Becker |
| 6,384,847 | B1 | 5/2002 | Rabenhorst |
| 6,400,366 | B1 | 6/2002 | Davies et al. |
| 6,429,868 | B1 | 8/2002 | Dehner, Jr. et al. |
| 6,466,946 | B1 | 10/2002 | Mishra et al. |
| 6,466,948 | B1 | 10/2002 | Levitsky et al. |
| 6,502,091 | B1 | 12/2002 | Chundi et al. |
| 6,584,433 | B1 | 6/2003 | Zhang et al. |
| 6,590,577 | B1 | 7/2003 | Yonts |
| 6,603,477 | B1 | 8/2003 | Tittle |
| 6,658,358 | B2 | 12/2003 | Hao et al. |
| 6,684,206 | B2 | 1/2004 | Chen et al. |
| 6,727,926 | B1 | 4/2004 | Utsuki et al. |
| 6,934,578 | B2 | 8/2005 | Ramseth |
| 7,020,869 | B2 | 3/2006 | Abrari et al. |
| 7,038,680 | B2 | 5/2006 | Pitkow |
| 7,202,868 | B2 | 4/2007 | Hao |
| 7,221,474 | B2 | 5/2007 | Hao et al. |
| 7,313,533 | B2 | 12/2007 | Chang et al. |
| 7,325,005 | B2* | 1/2008 | Forman et al. |
| 7,325,006 | B2* | 1/2008 | Fortnan et al. |
| 7,567,250 | B2 | 7/2009 | Hao et al. |
| 7,603,458 | B1 | 10/2009 | Sexton |
| 7,650,262 | B2 | 1/2010 | Pearson |
| 7,714,876 | B1 | 5/2010 | Hao |
| 7,716,227 | B1 | 5/2010 | Hao |
| 7,800,613 | B2 | 9/2010 | Hanrahan |
| 7,844,926 | B1 | 11/2010 | Russell |
| 7,921,363 | B1 | 4/2011 | Hao |
| 7,924,283 | B1 | 4/2011 | Hao |
| 7,940,271 | B2 | 5/2011 | Wright |
| 7,941,742 | B1 | 5/2011 | Hao et al. |
| 8,643,646 | B2 | 2/2014 | Hao |
| 2002/0059293 | A1 | 5/2002 | Hirsch |
| 2002/0118193 | A1 | 8/2002 | Halstead, Jr. |
| 2003/0065546 | A1 | 4/2003 | Goruer et al. |
| 2003/0071815 | A1 | 4/2003 | Hao et al. |
| 2003/0128212 | A1 | 7/2003 | Pitkow |
| 2003/0221005 | A1 | 11/2003 | Betge-Brezetz et al. |
| 2004/0051721 | A1 | 3/2004 | Ramseth |
| 2004/0054294 | A1 | 3/2004 | Ramseth |
| 2004/0054295 | A1 | 3/2004 | Ramseth |
| 2004/0095349 | A1 | 5/2004 | Bito |
| 2004/0201588 | A1 | 10/2004 | Meanor |
| 2004/0210540 | A1 | 10/2004 | Israel et al. |
| 2005/0066026 | A1 | 3/2005 | Chen et al. |
| 2005/0119932 | A1 | 6/2005 | Hao |
| 2005/0219262 | A1 | 10/2005 | Hao et al. |
| 2005/0284799 | A1 | 12/2005 | Bauer et al. |
| 2006/0026163 | A1* | 2/2006 | Forman et al. .................. 707/10 |
| 2006/0028471 | A1 | 2/2006 | Kincaid |
| 2006/0059439 | A1 | 3/2006 | Hao et al. |
| 2006/0095858 | A1 | 5/2006 | Hao et al. |
| 2006/0221077 | A1 | 10/2006 | Wright |
| 2006/0287831 | A1 | 12/2006 | Totiba |
| 2007/0040094 | A1 | 2/2007 | Smith |
| 2007/0225986 | A1 | 9/2007 | Bowe, Jr. et al. |
| 2008/0007555 | A1 | 1/2008 | Vrba |
| 2008/0033790 | A1 | 2/2008 | Nickerson |
| 2009/0033664 | A1 | 2/2009 | Hao |
| 2010/0103176 | A1 | 4/2010 | Hao |
| 2010/0107063 | A1 | 4/2010 | Hao et al. |
| 2010/0182320 | A1 | 7/2010 | Cartan |
| 2010/0188413 | A1 | 7/2010 | Hao et al. |
| 2010/0191678 | A1 | 7/2010 | Steed |
| 2010/0231594 | A1 | 9/2010 | Hao et al. |
| 2011/0298804 | A1 | 12/2011 | Hao et al. |
| 2012/0041801 | A1 | 2/2012 | Mascarenhas |
| 2012/0060080 | A1 | 3/2012 | Hao et al. |
| 2013/0194272 | A1 | 8/2013 | Hao et al. |
| 2013/0257903 | A1 | 10/2013 | Hao et al. |
| 2014/0204090 | A1 | 7/2014 | Hao |

OTHER PUBLICATIONS

Srinivasan Iyer et al., Adverse Event Profiles for Multi-drug Combinations, CS 341 Report, 2012 (10 pages).

Bozdog, D. et al, "Rare Events Analysis for High frequency Equity Data", Sep. 20, 2011 (13 pages).

Alsrheed, F.S. "To Develop a New Approach to the Visualization of Multivariate Datasets Based on the Scatterplot Concept", 2008 (68 pages).

Wikipedia, Single-linkage clustering, Sep. 7, 2012 (2 pages).

David Meyer et al., Visualizing Multi-way Contingency Tables, Oct. 2006 (27 pages).

B. Shneiderman, "Tree Visualization with Treemaps: a 2-D Space-Filling Approach", pp. 1-10, Jun. 1991.

Chris Stolte et al., "Polaris: A System for Query, Analysis and Visualiztion of Multidimensional Relational Databases," IEEE Transactions on Visualization and ComputerGraphics, vol. 8, No. 1, pp. 1-14 (Jan.-Mar. 2002).

D. Keim et al Pixel Bar Charts: A New Technique for Visualization Large Multi-Attribute Data Sets with Aggregation:, HP Technical Report, Apr. 2001, pp. 1-10.

Daniel A. Keim et al., "VisDB: Database Exploration Using Multi-dimensional Visualization," IEEE Graphics and Applications, vol. 14, No. 5, pp. 40-49 (1994).

Daniel Keim et al "Designing Pixel-Orientated Visualization Techniques: Theory and Applications" IEEE Transactions on Visualization and Computer Graphics, vol. 6, No. 1, Jan.-Mar. 2000, pp. 59-78.

Deun et al., Multidimensional Scaling, Open and Distance Learning, Jan. 12, 2000 (pp. 1-16).

Eamonn Keogh, Harry Hochheiser, and Ben Shneiderman; An Augmented Visual Query Mechanism for Finding Patterns in Time Series Data; 2002; Lecture Notes in Computer Science, Proceedings of the 5th International Conference on Flexible Query Answering Systems; Springer-Verlag; vol. 252212002; pp. 240-250.

H. Hochheiser et al., "Dynamic Query Tools for Time Series Data Sets: Timebox Widgets for Interactive Exploration," Information Visualization, vol. 3, pp. 1-18 (2004.

http://www.pavis.org/essay/multidimensional_scaling.html, 2001 Wojciech Basalaj, (pp. 1-30).

J. Fekete et al., "Interactive Information Visualization of a Million Items," Information Visualization, 2002, INFOVIS 2002, IEEE Symposium, Published Oct. 2002, pp. 1-8.

J. Yang et al., "Visual Hierarchical Dimension Reduction for Exploration of High Dimensional Datasets," Joint Eurographics/IEEE TCVG Symposium on Visualization, pp. 19-28 (May 2003).

Jessica Lin, Eamonn Keogh, Stefano Lonardi, Jeffrey P. Lankford, Donna M. Nystrom; Visually Mining and Monitoring Massive Time Series; 2004; International Conference on Knowledge Discovery and Data Mining archive, Proceedings of the tenth ACM SIGKDD international conference on Knowledge discovery and data mining table of contents; pp. 460-469.

M. Ankerst et al "Towards an effective cooperation of the computer and the computer user for classification, Proc. 6th Int. Conf. on Knowledge Discovery and Data Mining," (KDD'2000), Aug. 20-23, 2000, Boston, MA, 2000, pp. 1-10.

M. Trutschl et al., "Intelligently Resolving Point Occlusion," Information Visualization, 2003, INFOVIS 2003, IEEE Symposium, Published Oct. 2003, Abstract only.

M.C. Hao et al "Visual Mining of E-customer Behavior Using Pixel Bar Charts,", HP Technical Report, Jun. 20, 2001, pp. 1-7.

(56) References Cited

OTHER PUBLICATIONS

Matthew O. Ward, "XmdvTool: Integrating Multiple Methods for Visualizing Multivariate Data," Proc. Visualization, pp. 326-331 (Oct. 1994).
Office Actions of File History of U.S. Appl. No. 12/321,612, dated Feb. 27, 2013, Jul. 11, 2012, Feb. 10, 2012, and Aug. 25, 2011 (101 pages).
Office Actions of File History of U.S. Appl. No. 12/381,716, dated Apr. 18, 2013, Aug. 30, 2012, and Mar. 30, 2012 (60 pages).
P. Buono et al., "Technical Research Report, Interactive Pattern Search in Time Series," Institute for Systems Research, TR 2005-57, pp. 1-11 (2004.
T. Buring et al., "User Interaction with Scatterplots on Small Screens—A Comparative Evaluation of Geometric-Semantic Zoom and Fisheye Distortion," Visualization and Computer Graphics, IEEE Transactions, Published Sep.-Oct. 2006, pp. 1-8.
US; Non-Final Office Action cited in U.S. Appl. No. 13/873673; mailed Jul. 30, 2015; 30 pages.

* cited by examiner

VISUALIZING A RELATIONSHIP OF ATTRIBUTES USING A RELEVANCE DETERMINATION PROCESS TO SELECT FROM CANDIDATE ATTRIBUTE VALUES

BACKGROUND OF THE INVENTION

With traditional techniques of visualizing attributes (or variables) of data records, it can be difficult to understand the relationship of the attributes. There can be a relatively large number of data records, and certain attributes of the data records can be associated with a relatively large number of categorical values. When a relatively large amount of information is to be visualized, the result can be a cluttered visualization where users have difficulty in understanding the visualized information.

BRIEF SUMMARY OF THE INVENTION

As described herein, for a plurality of categorical values of a first attribute, more relevant categorical values of a second attribute may be selected from among candidate categorical values of the second attribute, where the selecting may utilize a relevance determination process that considers frequencies of occurrence of respective pairs of the categorical values of the first and second attributes. A visualization that may include groups of cells corresponding to the respective pairs of categorical values of the first and second attributes may be generated. At least one of the groups may include cells assigned visual indicators based on values of a third attribute.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments are described with respect to the following figures.

DETAILED DESCRIPTION

Large amounts of data may not be effectively visualized in a traditional graphical visualization. There can be relatively large amounts of data records, and the data records may have attributes associated with relatively large numbers of categorical values. One example attribute is a Drug attribute, which can have many categorical values representing different drugs. Another example attribute is a Reaction attribute, which can have many categorical values representing respective reactions to drugs. A categorical value of an attribute is represented by a character string. For example, a categorical value of the Drug attribute is represented by the name of a drug.

Visualizing all of the possible categorical values of the Drug attribute and Reaction attribute that are found in a relatively large number of data records can result in a cluttered visualization, which can make it difficult for a user to understand the relevance between the categorical values of the Drug and Reaction attributes. For example, given a large number of categorical values of a given attribute, traditional visualization techniques do not allow for the depiction of the more relevant categorical values of the given attribute with respect to categorical values of another attribute.

For example, in the context of the Drug and Reaction attributes discussed above, it may be desirable to separate relevant reactions from irrelevant reactions to various drugs. For example, a particular reaction to a particular drug may occur with relatively low frequency, which is an indication that this drug-reaction pair is less important and thus should not be visualized since it would be wasteful of valuable visualization space.

Figure 1:
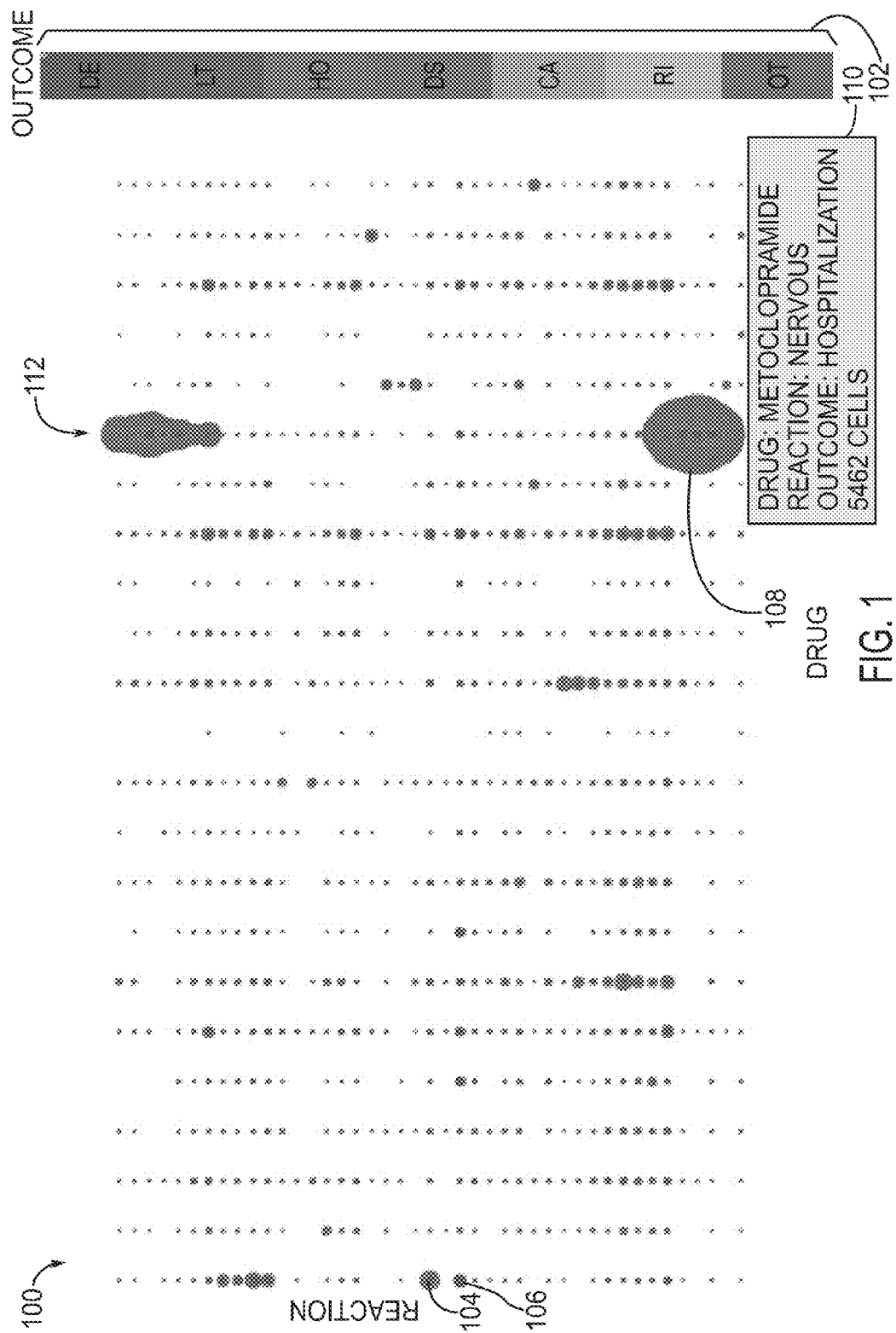
FIG. 1 is a graphical view of an example visualization screen that depicts a relationship among attributes, in accordance with some implementations.

In accordance with some implementations, to more effectively depict attributes (and their relative relevance) of data records, a cell-based visualization is provided that uses a relevance determination process (discussed further below) for identifying relevant categorical values of a given attribute with respect to categorical values of another attribute. The cell-based visualization can plot cells (also referred to as pixels) representing respective events at points on a visualization screen. An event (e.g. corresponding to a drug-reaction pair) is expressed by a corresponding data record. An example includes a visualization screen 100 shown in FIG. 1. The visualization screen 100 has a horizontal axis (x axis) and a vertical axis (y axis), which represent respective first and second attributes. The visualization screen 100 includes an x-y cell plane. In the example of FIG. 1, the x attribute is a Drug attribute, and the y attribute is a Reaction attribute. A cell (or pixel) represents a respective event and corresponds to a respective pair of a categorical value of the x attribute and a categorical value of the y attribute in the respective data record. The cell is plotted at a position of the visualization screen 100 based on the categorical value of the x attribute and the categorical value of the y attribute in the respective data record.

A cell (or pixel) refers to a graphical element that is used for representing an event that corresponds to an x-y value pair. A cell (or pixel) can be in the form of a dot or graphical structure of any other shape. An event is expressed by a data record, and a data record can refer to any discrete unit of data that is received by a system. Each data record can have multiple attributes that represent different aspects of an event. For example, in the context of analysis relating to a drug trial, the events can include consumption of various different drugs by individuals, along with the corresponding reactions. The information collected in the drug trial can include reactions of the individuals to consumption of the drugs, as well as the corresponding outcomes. As an example, a data record can include the following attributes: Drug, Reaction, and Outcome (among other attributes). The Drug attribute can have multiple categorical values that represent different drugs. The Reaction attribute can have different categorical values that represent different reactions by individuals. The Outcome attribute can have multiple categorical values that represent different outcomes associated with respective drug-reaction pairs.

The categorical values of the Drug attribute can include drug names that identify different types of drugs that are the subject of analysis. Similarly, the categorical values of the Reaction attribute and Outcome attribute can represent different reactions and different outcomes, respectively, associated with taking the drugs.

In the visualization screen 100 of FIG. 1, an x coordinate represents the different categorical values of the Drug attribute, while a y coordinate represents the different categorical values of the reaction attribute. Each cell is plotted in the graphical visualization 100 at an x-y coordinate that corresponds to a categorical value of the x attribute (in this case the Drug attribute) and a categorical value of the y attribute (in this case the Reaction attribute) of the corresponding data record.

The cells in the graphical visualization 100 can also be assigned visual indicators (e.g. different colors, different gray scale indicators, different patterns, etc.) according to values of a third attribute (different from the x and y attributes) in the respective data records. In the example of FIG. 1, the third attribute is the Outcome attribute. Different colors are assigned to the cells in FIG. 1 according to different categorical values of the Outcome attribute. In a different example, the colors assigned to the cells can be based on numerical attributes of a different attribute. A color scale 102 in the graphical visualization 100 maps different values of the Outcome attribute to different colors. In an example, the different values of the outcome attribute can include the following: a DE value (which represents death as the outcome), an LT value (which represents a life-threatening condition as the outcome), an HO value (which represents hospitalization as the outcome), a DS value (which represents disability as the outcome), a CA value (which represents a congenital anomaly as the outcome), an RI value (which represents intervention as the outcome), and an OT value (which represents an "other" outcome). Although specific values of the Outcome attribute are shown in FIG. 1, it is noted that in other examples, other values of the Outcome attribute can be used.

Moreover, even though the example graphical visualization 100 depicts a visualization of the Drug attribute, Reaction attribute, and Outcome attribute, it is noted that the graphical visualization 100 can similarly be used for representing a relationship among other attributes in other examples.

Two example groups of cells are identified as 104 and 106 in FIG. 1. The group 106 of cells includes just cells assigned the red color, which corresponds to the Outcome attribute having the DE value. On the other hand, the group 104 of cells includes both cells assigned the red color and cells assigned the green color (where the green color corresponds to the HO value). The cells in the first group 104 are plotted in a first region of the visualization screen 100, while the cells in the second group are plotted in a second, discrete region of the visualization screen 100.

Each group of cells corresponds to events that share a common pair of categorical values of the x attribute and y attribute (in other words, share the same x-y value pair). Traditionally, points that represent events that share the same x-y value pair may be plotted at the same position in a visualization screen, which results in occlusion of the multiple points representing the events sharing the same x-y value pair. In contrast, in accordance with some implementations, instead of plotting cells representing events that share the same x-y value pair at the same position in the graphical visualization 100, the cells are placed at different nearby positions close to each other, to form a group of the cells representing the events sharing the same x-y value pair. The cells in this group are placed in a respective region of the graphical visualization 100, where the region can have a circular shape, an oval shape, an ellipsoid shape, or any other shape.

Within each region, the cells are sorted according to the values of the third attribute (which in the example is the Outcome attribute). Sorting the cells of a region refers to placing the cells in the region according to the values of the third attribute. By performing the sorting, cells are positioned in proximity to each other according to the values of the third attribute, such that cells that share or have relatively close values of the third attribute are placed closer to each other than cells that have greater differences in the values of the third attribute.

The sorting allows sub-groups of cells to be formed within each group. Thus, for example, in group 104 in FIG. 1, a first sub-group includes the cells assigned the red color, while a second sub-group includes cells assigned the green color. The cells assigned the green color in the group 104 are placed in a ring around the cells assigned the red color. By sorting the cells such that respective sub-groups are visible, a user can more easily determine the relative amounts of cells assigned to different values of the third attribute.

Although the various groups of cells depicted in the graphical visualization 100 of FIG. 1 are for the most part placed in discrete regions that do not overlap each other, there can be instances where large amounts of data records at neighboring x-y value pairs may result in some overlap of cells for different x-y value pairs. For example, a multi-group cluster 108 has cells corresponding to multiple x-y value pairs. The multi-group cluster 108 corresponds to a relatively large number of data records that share a common x value, but span six neighboring y values. In other words, the data records in the multi-group cluster 108 cover six reactions to a corresponding drug.

In the multi-group cluster 108, there are a relatively large number of data records that have the Outcome attribute assigned the OT value (brown cells) and DS value (purple cells). The cells assigned the brown color (Outcome attribute having the OT value) are provided in an outer oval ring in the multi-group cluster 108. The cells assigned the purple color (Outcome attribute having the DS value) are provided in another oval ring inside the outer oval ring. Note that in the region occupied by the multi-group cluster 108 of cells, there are smaller numbers of cells that are assigned the DE value (red cells) and HO value (green cells) of the Outcome attribute. As a result, the red cells and green cells can be provided in sub-regions within the region representing the multi-group cluster 108.

The visualization screen 100 can be an interactive visualization screen. A user can move a cursor (such as by using a user input device) over any of the cells depicted in the visualization screen 100. When the cursor is moved over a particular cell, a pop-up dialog box, such as dialog box 110, is presented to provide detailed information regarding the selected cell. In the example dialog box 110, the categorical value (Metoclorpramide) of the Drug attribute, the categorical value (Nervous) of the Reaction attribute, and the categorical value (Hospitalization) of the Outcome attribute are depicted. Additionally, the number of cells (5,642) that share the specific x-y value pair corresponding to the selected cell are also depicted.

Although reference is made to user interaction that moves a cursor over a cell, it is noted that in other examples, other interactive inputs can be provided, such as a touch on a touchscreen display device, and so forth.

Figure 2:
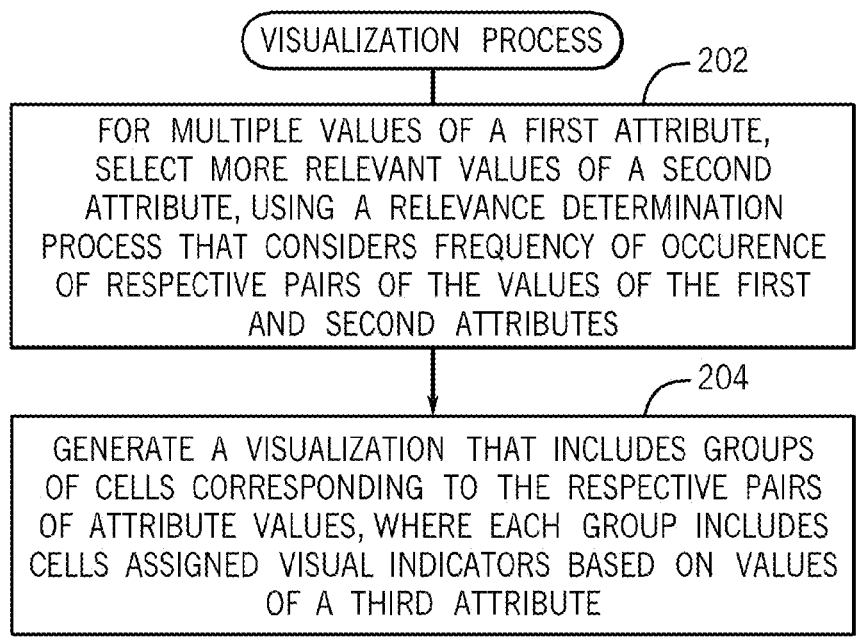
FIG. 2 is a flow diagram of a visualization process, in accordance with some implementations.

FIG. 2 is a flow diagram of a visualization process according to some implementations. For multiple categorical values of a first attribute (e.g. the x attribute shown in FIG. 1), more relevant categorical values of a second attribute (e.g. y attribute) are selected (at 202) from candidate second attribute values using a relevance determination process that considers frequencies of occurrence of respective pairs of the values of the first and second attributes. The candidate second attribute values are all possible categorical values of the second attribute. Further details regarding the relevance determination process are discussed further below. By using the relevance determination process, just a subset of all possible y attribute categorical values can be selected the relevance determination process selects those y attribute values (from among the candidate y attribute values) that are deemed to be more relevant to the x attribute values, based on frequencies of occurrence of respective x-y value pairs (discussed further below). For example, a y attribute value is deemed to be more relevant to a given x attribute value if a relevance value derived based on the frequency of occurrence of the pair of x and y attribute values exceeds a specified threshold.

The visualization process of FIG. 2 next generates (at 204) a visualization screen, such as the visualization screen 100 of FIG. 1, that includes groups of cells corresponding to respective value pairs of the first and second attributes. Each group includes cells assigned visual indicators based on values of a third attribute.

In laying out the cells to generate the visualization screen, all cells representing data records that have the same x-y value pair are placed in a circle or oval (e.g. 104, 106, or 108 in FIG. 1) or other region around a first central cell that is located at the x-y position. The overlapping data records that share the same x-y value pair are sorted according to values of the third attribute and placed around the x-y position at un-occupied positions in the circle, oval, or other region.

As an example, a first cell representing a first received data record that has a given x-y value pair is placed at the corresponding x-y position in the visualization screen 100. A second cell representing a second data record that has the given x-y value pair is then placed at another x-y position near the first cell. A third cell representing a third data record that has the given x-y value pair is then placed at a nearby position near the first and second cells. As part of placing the cells, the cells are also sorted according to values of a third attribute. This process is re-iterated for each subsequent data record that has the given x-y value pair.

Figure 3:
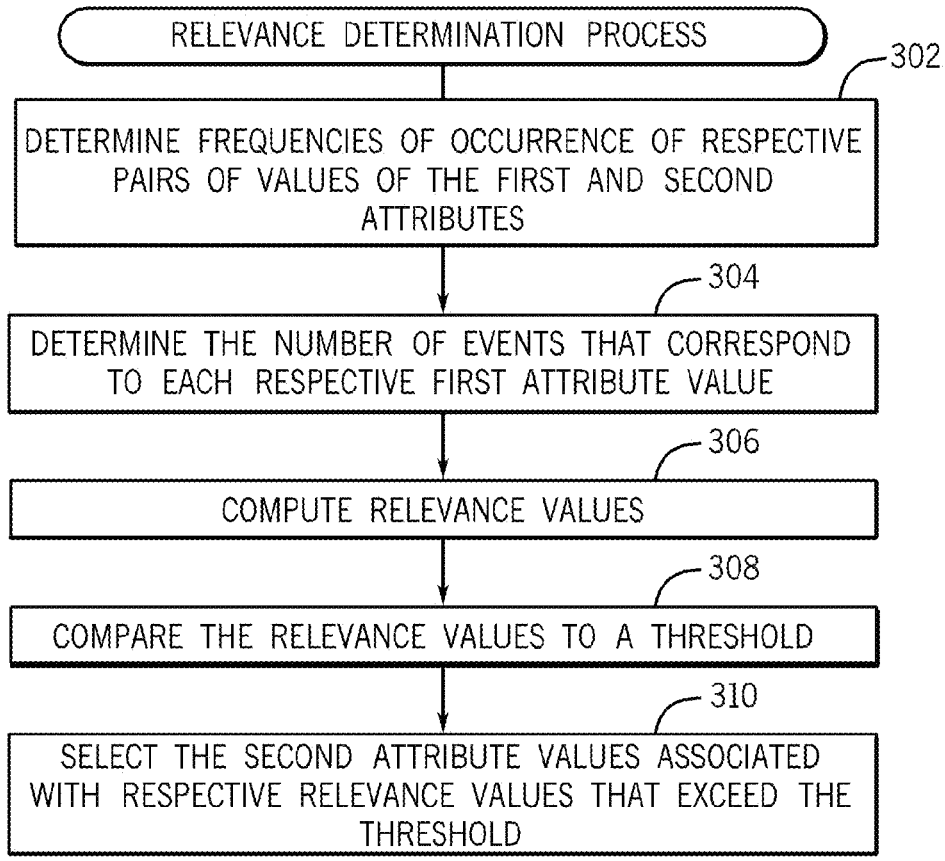
FIG. 3 is a flow diagram of a relevance determination process, in accordance with further implementations.

FIG. 3 is a flow diagram of the relevance determination process used in task 202 for selecting more relevant categorical values of the second attribute y with respect to categorical values of the first attribute x. For an x-y value pair, there is a respective number of data records that contain this x-y value pair. For example, for the value pair that includes the Drug attribute having the "Metoclopramide" value and the Reaction attribute having the "Nervous" value, there are 5,462 data records (representing respective events) that contain this particular pair of the Drug and Reaction attribute values (as depicted in the dialog box 110 in FIG. 1). The number of data records that contain a respective value pair of first and second attribute values (x-y value pair) refers to a frequency of occurrence of this value pair. Different x-y value pairs can be associated with different frequencies of occurrence.

The relevance determination process determines (at 302) frequencies of occurrence of respective x-y value pairs (respective pairs of categorical values of the first attribute and second attribute). Let df(x,y) represent the frequency of a given pair of an x attribute value and a y attribute value. For different categorical values of y (e.g. $y_1, y_2, \ldots, y_M$, where M is greater than one and represents the number of all possible y attribute values), there is a corresponding number of frequencies of occurrence of the following value pairs: $(x,y_1)$, $(x,y_2), \ldots, (x,y_M)$. The respective frequencies of occurrence for the listed pairs are as follows: $df(x,y_1), df(x,y_2), \ldots, df(x,y_M)$.

The relevance determination process next determines (at 304) the number of events that correspond to each respective categorical value of the first attribute (e.g. x attribute). If there are n categorical values of the x attribute, where n is greater than one, then numbers of events of the respective categorical values of the x attribute are represented as: $n(x_1), n(x_2), \ldots, n(x_n)$. The relevance determination process then computes (at 306) relevance values, represented as:

$$r(x_i, y_j) = \frac{df(x_i, y_j)}{n(x_i)},$$

where $i = 1$ to $n$ and $j = 1$ to $M$.

Effectively, the relevance value r(x,y) for a given x-y value pair is equal to the frequency of occurrence of the x-y value pair divided by the overall number of events corresponding to the specific x value. Next, the relevance determination process compares (at 308) the relevance values computed above to a predefined threshold t, where t can be specified by a user, an application, or by some other mechanism.

The relevance determination process then selects (at 310) the second attribute values associated with respective relevance values that exceed (or have another predetermined relationship with) the threshold t. A predetermined relationship with the threshold can include any one of the following relationships: exceeds (is greater than), is less than, is equal to, or any other relationship. Thus, each of $r(x_i, y_1)$, $r(x_i, y_2), \ldots, r(x_i, y_M)$ is compared to t, to identify which of $r(x_i, y_1), r(x_i, y_2), \ldots, r(x_i, y_M)$ exceeds the threshold t. Thus, if $r(x_i, y_2)$ exceeds t, then the second attribute value $y_2$ is selected at 310. Similarly, if $r(x_i, y_M)$ exceeds the threshold t, then the second attribute value $y_M$ is selected at 310. On the other hand, if $r(x_i, y_1)$ for all i does not exceed t, then the second attribute value $y_1$ is not selected at 310. From the M candidate y attribute values, it is assumed that in categorical values of the y attribute are selected at 310.

The selected categorical values are placed into a data structure R(x,y), which includes each y value whose respective relevance value exceeds t. In other examples, instead of comparing relevance values to the threshold t, the frequencies of occurrence of each x-y value pair can instead be compared to a different threshold for determining which y attribute values are relevant and should be selected.

The relevance determination process is repeated for each categorical value of the x attribute. Each iteration of the relevance determination process produces a respective data structure R(x,y). After all iterations have been performed, all selected y values across all x values are stored into an output data structure R. Effectively, the multiple R(x,y) data structures produced by the multiple iterations of the relevance determination process are merged into the output data structure R, which includes the x values and the related y values that are to be visualized using visualization techniques according to some implementations.

Figures 4A, 4B:
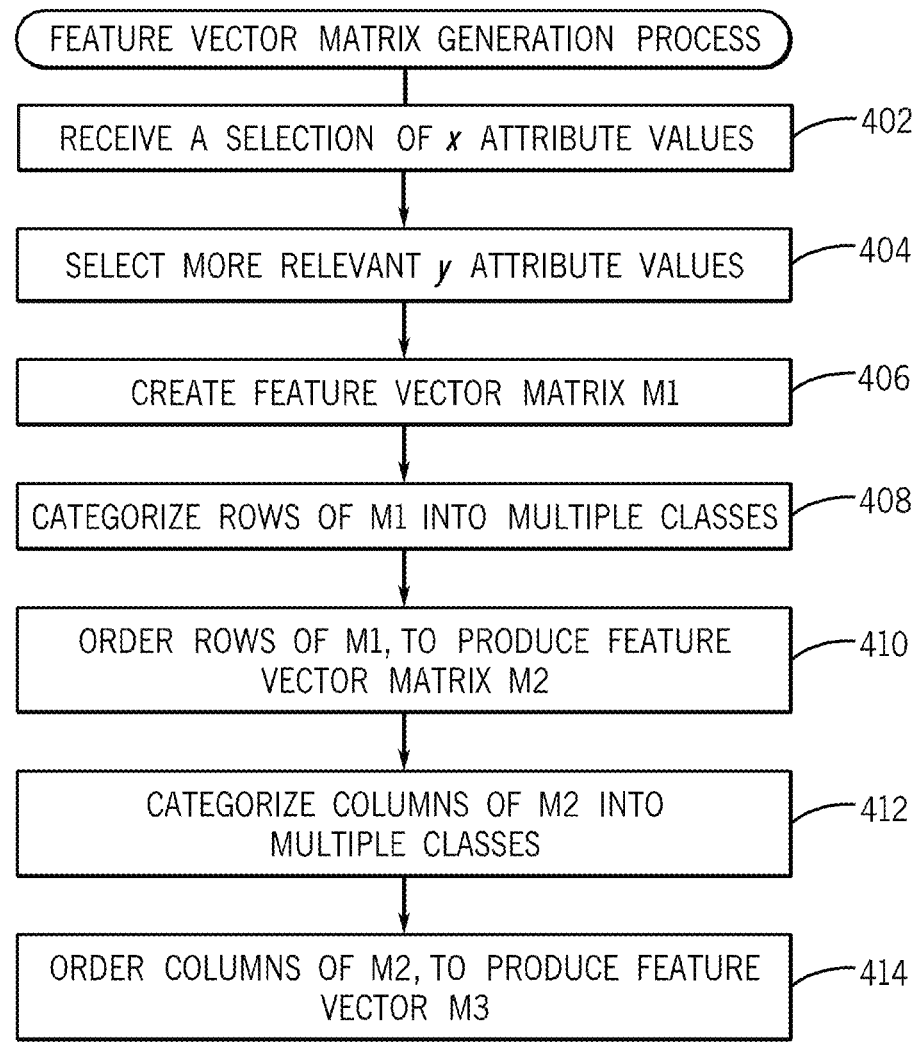
FIG. 4A is a flow diagram of a feature vector matrix generation process, in accordance with some implementations.
FIG. 4B illustrates an example feature vector matrix, in accordance with some implementations.

FIG. 4A is a flow diagram of a process of generating a feature vector matrix that is useable for generating a visualization screen according to some implementations. Although reference is made to a feature vector matrix in this discussion, it is noted that other types of data structures can be employed in other implementations. As discussed below, the feature vector matrix can be used to group and order the first and second attribute values (e.g. x and y attribute values). The grouping and ordering of the first and second attribute values is used to define how the attribute values are to be arranged in a visualization screen, as depicted in examples shown in FIGS. 5 and 6 (discussed further below).

The process of FIG. 4A receives (at 402) a selection of the categorical values of an x attribute that are to be displayed in a visualization. It is assumed that there are n categorical values of the x attribute. The selection of the categorical values of the x attribute can be performed by a user, by an application, or by some other mechanism.

Next, using the relevance determination process discussed above, the more relevant categorical values of the y attributes are selected (at 404). It is assumed that there are m categorical values of the y attribute. Note that both m and n can be greater than or equal to 1.

Next, the process of FIG. 4A creates (at 406) a feature vector matrix that has n rows (e.g. corresponding to n drugs) and m columns (e.g. corresponding to m reactions). In some examples, this feature vector matrix is identified as M1. The n rows of the feature vector matrix contains information for respective different x attribute values, while the m columns of the feature vector matrix contains information for respective different y attribute values. An example feature vector matrix 400 is depicted in FIG. 4B, which shows n rows corresponding to x attribute values x1,x2, . . . , xn, and m columns corresponding to y attribute values y1,y2,y3, . . . , ym. Each entry of the feature vector matrix 400 corresponds to a pair of an x attribute value and a y attribute value (x-y value pair). An entry of the feature vector matrix 400 contains a value representing a relevance value, r(x,y) for the corresponding x-y value pair, as discussed above. For example, the entry at the intersection of x2 and y2 has a frequency of occurrence value 19, which indicates that there are 19 occurrences of the x2-y2 value pair.

Next, the n rows of the feature vector matrix M1 corresponding to x attribute values x1, . . . , xn are categorized (at 408) into multiple predefined classes (e.g. hypoglycemic class, NSAID class, statins class). The classes can be selected by a user or an application, or can be preconfigured. In some examples, the categorizing (408) can employ a single-linkage clustering technique. In other examples, other types of clustering techniques can be used. In the example where the x attribute is the Drug attribute, the multiple classes can be multiple classes of drugs.

In the feature vector matrix M1, each row can be considered a feature vector for the corresponding x attribute value (e.g. value of the Drug attribute). In such example, the rows of the feature vector matrix M1 can correspond to different drugs. A feature vector includes multiple features correspond to respective x-y value pairs. In FIG. 4B, each feature is the frequency of occurrence of the x attribute value and the corresponding y attribute value. Thus, a feature of a feature vector for a given drug is the frequency of occurrence of the combination of the given drug and the respective reaction. All features (reactions) to the given drug together form the feature vector for the given drug, and this feature vector is provided as a row in the feature vector matrix 400 of FIG. 4B.

The feature vectors can then be compared, such as by computing the Euclidean distance between the vectors. In other examples, other comparison techniques can be used. If the feature vectors are clustered using the single-linkage clustering technique, the two closest drugs are clustered together in each iteration, until all drugs in the feature vector matrix have been processed.

The rows of the feature vector matrix M1 corresponding to the x attribute values x1, . . . , xn are also ordered (at 410) by frequency of events. In some implementations, the ordering is performed as part of the single-linkage clustering technique discussed above, where the clustering also causes the rows to be ordered according to relative frequencies. The ordered feature vector matrix is identified as M2. For example, in the ordered feature vector matrix, within a subset of rows for a given class, the first row in the subset can correspond to the drug associated with the highest frequency of occurrence across all reactions (in other words, highest numbers of events). Successive rows in the subset can correspond to other drugs associated with successively lower numbers of events.

The columns of the ordered feature vector matrix M2 are then categorized (at 412) using the same technique as the row categorization (408). For example, the categorizing of the columns can also use the single-linkage clustering technique. The columns corresponding to the y attribute values y1, . . . , ym of the ordered feature vector matrix M2 are ordered (at 414), which can be performed as part of the categorizing (at 412). This further ordered feature vector matrix is identified as M3.

The final output is thus an ordered feature vector matrix (M3) that has both ordered rows and columns. The ordered feature vector matrix M3 can then be used to produce a visualization screen that contains cells plotted based on the arrangement of the ordered feature vector matrix M3.

Figure 5:
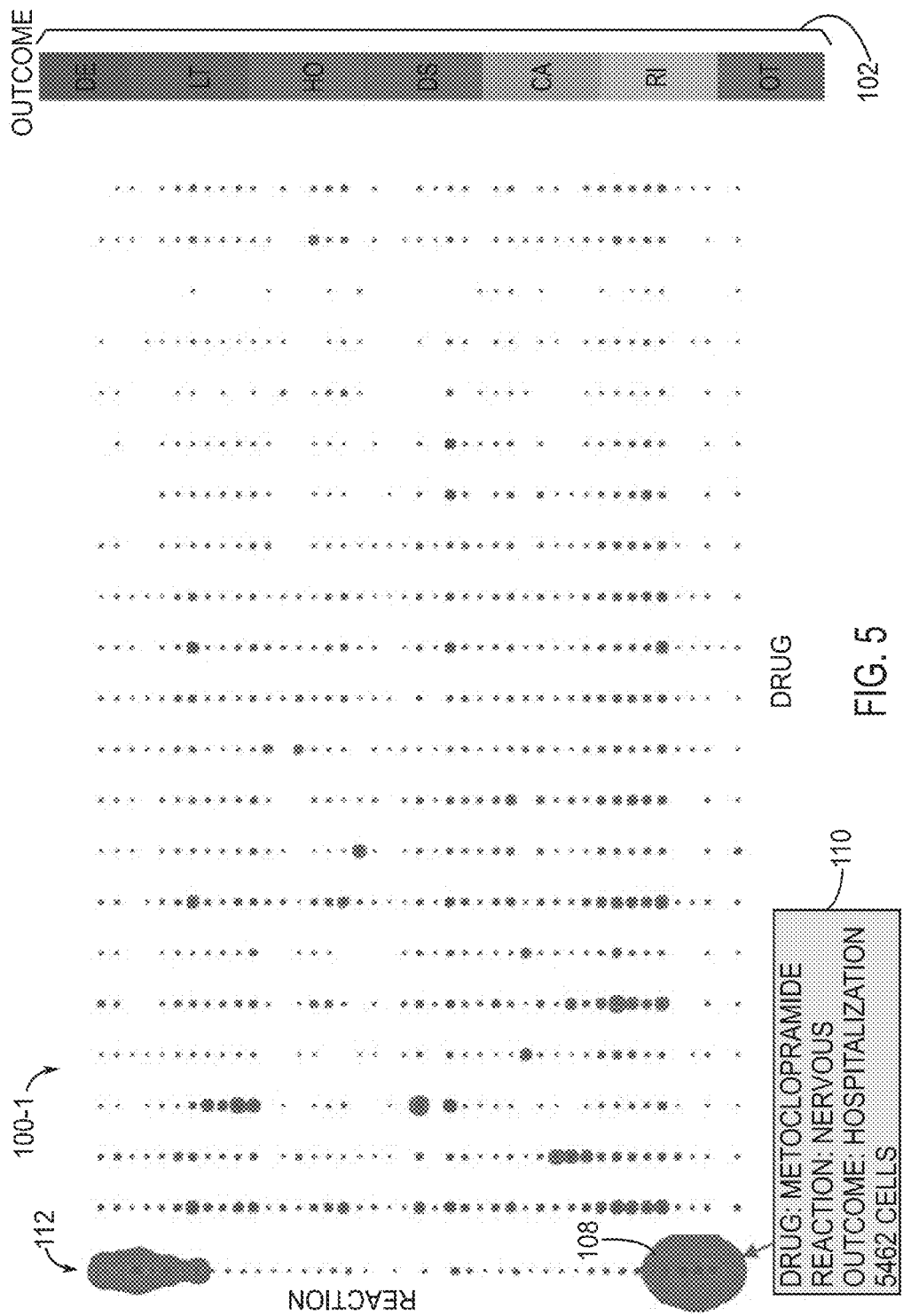
FIGS. 5 and 6 are graphical views of additional example visualization screens according to some implementations.

FIG. 5 shows an example of a visualization screen 100-1, in which the x attribute values have been re-ordered by frequency as compared to the visualization screen 100 of FIG. 1. FIG. 5 does not depict the grouping of the Drug attribute values by class name. The ordering of x attribute values in the visualization screen 100-1 can be based on the ordering in the feature vector matrix performed at 410 in FIG. 4A, for example. The events represented by the visualization screen 100-1 are the same as those depicted by the visualization screen 100 of FIG. 1, except that in the visualization screen 100-1, the columns in the visualization screen 100 corresponding to the x attribute values have been re-ordered. For example, column 112 in the visualization screen 100 of FIG. 1 is associated with the highest frequency in terms of the number of events. Therefore, column 112 is re-ordered in the visualization screen 100-1 of FIG. 5 as the first column in the visualization screen 100-1. More generally, the drug with the highest frequency can be placed on the far left in the visualization screen 100-1. Drugs with lower frequencies are then progressively placed to the right in order of frequency. In other examples, the placement of columns corresponding to difference frequencies can be arranged in a different manner.

By ordering the rows and/or columns of the feature vector matrix as discussed above, an ordered presentation of the attribute categorical values in a visualization screen can be provided (such as illustrated in FIG. 5), to allow a user to more easily understand the visualized information and to detect patterns and anomalies. Also, with the ordering, such as shown in FIG. 5, an outlier drug can be more easily identified. An example of such outlier drug is a drug represented by the rightmost column in the visualization screen 100-1.

Figure 6:
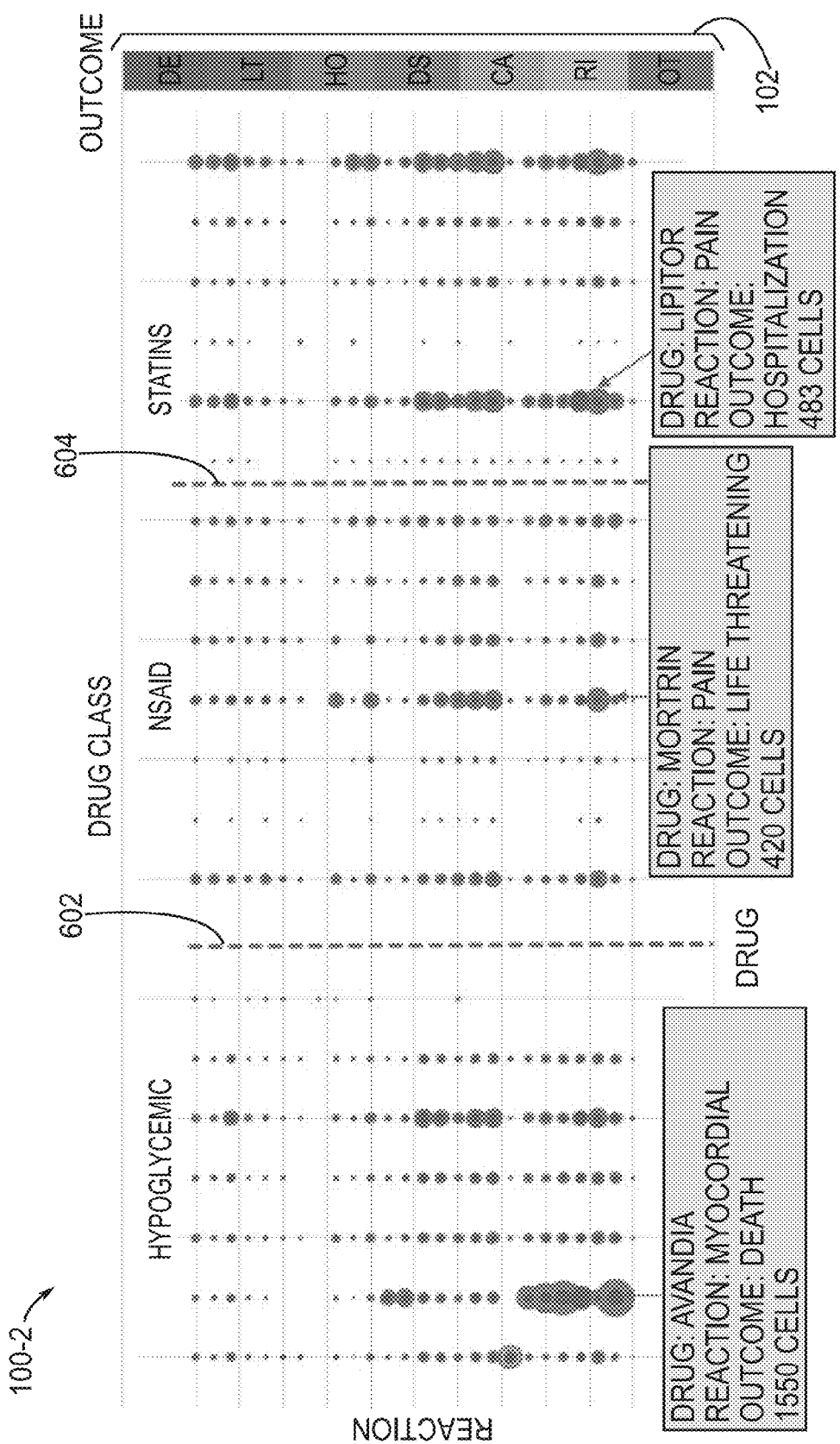

FIG. 6 shows a visualization screen 100-2 that shows events associated with three classes of the Drug attribute, including a hypoglycemic class, an NSAID class, and a statins class, which are divided by dashed vertical lines 602 and 604. The drugs represented by the visualization screen 100-2 are divided into these three classes. Within each class, the placement of columns can be ordered according to frequencies (in terms of number of events).

Figure 7:
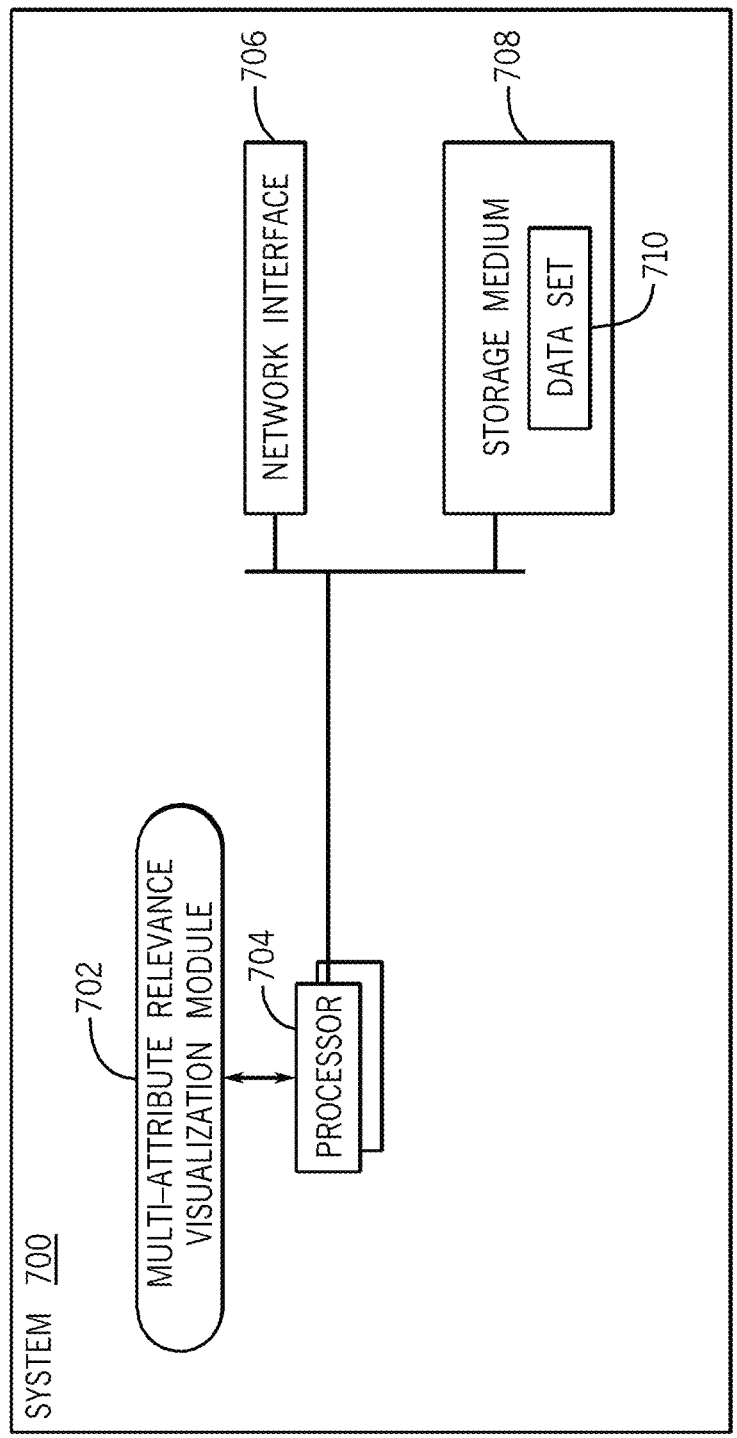
FIG. 7 is a block diagram of a system that is able to incorporate some implementations.

FIG. 7 is a block diagram of an example system 700 that has a multi-attribute relevance visualization module 702 according to some implementations, which can perform various tasks discussed above, including those tasks depicted in any of FIGS. 2-4A. The multi-attribute relevance visualization module 702 can also produce the visualization screens according to some implementations, such as those depicted in FIGS. 1, 5, and 6.

The multi-attribute relevance visualization module 702 can be implemented as machine-readable instructions executable on one or multiple processors 704. A processor can include a microprocessor, microcontroller, processor module or subsystem, programmable integrated circuit, programmable gate array, or another control or computing device. The processor(s) 704 can be connected to a network interface 706 and a storage medium (or storage media) 708.

The storage medium (storage media) 708 can store a dataset 710 (containing data records) that has been received by the system 700. The dataset 710 is processed by the multi-attribute relevance visualization module 702 to produce visualization screens according to some implementations.

The storage medium (or storage media) 708 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A computer-implemented method of visualizing a relationship of attributes in data records, comprising:
for plural categorical values of a first attribute, selecting, by a system having a processor, more relevant categorical values of a second attribute from among candidate categorical values of the second attribute, wherein the selecting uses a relevance determination process that considers frequencies of occurrence of respective pairs of the categorical values of the first and second attributes; and
generating, by the system, a visualization that includes groups of cells corresponding to the respective pairs of categorical values of the first and second attributes, each of the cells corresponding to a pair of categorical values of the first and second attributes in a respective data record, wherein at least one of the groups includes cells assigned visual indicators based on values of a third attribute, wherein generating the visualization comprises:
placing cells sharing a given pair of a first categorical value of the first attribute and a second categorical value of the second attribute in a region corresponding to an intersection of the first categorical value and the second categorical value in the visualization, wherein the placing avoids overlaying of the placed cells.

2. The method of claim 1, further comprising:
computing relevance values for corresponding ones of the candidate categorical values of the second attribute, wherein the relevance values are based on the corresponding frequencies of occurrence of respective pairs of the categorical values of the first and second attributes,
wherein selecting the more relevant categorical values of the second attribute includes selecting, based on the relevance values, a subset of the candidate categorical values of the second attribute.

3. The method of claim 2, wherein computing a particular one of the relevance values comprises dividing a corresponding frequency of occurrence of a particular pair of the categorical values of the first and second attributes by a number of events corresponding to a particular categorical value of the first attribute.

4. The method of claim 2, further comprising:
comparing the relevance values to a threshold, wherein selecting the subset comprises selecting the subset of the candidate categorical values of the second attribute associated with respective relevance values that have a predefined relationship with the threshold.

5. The method of claim 1, further comprising:
generating a feature vector data structure that relates the categorical values of the first attribute to the categorical values of the second attribute, wherein an entry of the feature vector data structure corresponding to a pair of a first attribute value and a second attribute value has a value based on the corresponding frequency of occurrence of the pair of the first attribute value and the second attribute value.

6. The method of claim 1, wherein generating the visualization further comprises:
sorting the cells sharing the given pair of the first categorical value and the second categorical value according to respective values of the third attribute, wherein the cells in the region are placed based on the sorting.

7. The method of claim 6, wherein placing the cells in the region based on the sorting causes sub-groups of the cells to be formed, wherein each of the sub-groups correspond to cells sharing a common value of the third attribute.

8. The method of claim 7, wherein the visual indicators assigned to the cells in the region include different colors, and wherein the cells in each sub-group share a common assigned color.

9. A computer-implemented method of visualizing a relationship of attributes in data records, comprising:
for plural categorical values of a first attribute, selecting, by a system having a processor, more relevant categorical values of a second attribute from among candidate categorical values of the second attribute, wherein the selecting uses a relevance determination process that considers frequencies of occurrence of respective pairs of the categorical values of the first and second attributes;
generating, by the system, a visualization that includes groups of cells corresponding to the respective pairs of categorical values of the first and second attributes, each of the cells corresponding to a pair of categorical values of the first and second attributes in a respective data record, wherein at least one of the groups includes cells assigned visual indicators based on values of a third attribute;

generating a feature vector data structure that relates the categorical values of the first attribute to the categorical values of the second attribute, wherein an entry of the feature vector data structure corresponding to a pair of a first attribute value and a second attribute value has a value based on the corresponding frequency of occurrence of the pair of the first attribute value and the second attribute value;

categorizing rows or columns in the feature vector data structure into a plurality of classes; and ordering the rows or columns in the feature vector data structure according to numbers of events associated with the corresponding first or second attribute values.

10. An article comprising at least one non-transitory machine-readable storage medium storing instructions that upon execution cause a system to:

receive categorical values of a first attribute to be visualized;

select categorical values of a second attribute that are more relevant to the categorical values of the first attribute, wherein the selecting selects from among candidate categorical values of the second attribute and uses a relevance determination process that compares relevance values based on frequencies of occurrence of respective pairs of the categorical values of the first and second attributes to a threshold; and generate a visualization screen that includes groups of cells corresponding to the respective pairs of categorical values of the first and second attributes, wherein at least one of the groups includes cells assigned visual indicators based on values of a third attribute, wherein generating the visualization screen comprises placing cells sharing a given pair of a first categorical value of the first attribute and a second categorical value of the second attribute in a region corresponding to an intersection of the first categorical value and the second categorical value in the visualization screen, wherein the placing avoids overlaying of the placed cells.

11. The article of claim 10, wherein the visualization screen includes regions for respective groups of the groups of cells.

12. The article of claim 11, wherein a size of each region is indicative of a corresponding frequency of occurrence of the respective pair of categorical values of the first and second attributes.

13. The article of claim 10, wherein the relevance determination process further comprises:

computing the relevance values for the corresponding categorical values of the second attribute based on the respective frequencies of occurrence.

14. The article of claim 13, wherein computing a particular one of the relevance values comprises dividing a corresponding frequency of occurrence of a particular pair of the categorical values of the first and second attributes by a number of events corresponding to a particular categorical value of the first attribute.

15. The article of claim 10, wherein the visual indicators include different colors mapped to different values of the third attribute.

16. The article of claim 10, wherein the instructions upon execution cause the system to further:

receive interactive user input in the visualization screen; and in response to the interactive user input, display a dialog box containing further information associated with a data record represented by a cell.

17. The method of claim 10, wherein the instructions upon execution cause the system to further:

generate a feature vector data structure that relates the categorical values of the first attribute to the categorical values of the second attribute, wherein an entry of the feature vector data structure corresponding to a respective pair of a value of the first attribute and a value of the second attribute has a respective relevance value of the relevance values;

categorize rows or columns in the feature vector data structure into a plurality of classes; and order the rows or columns in the feature vector data structure according to numbers of events associated with the corresponding values of the first or second attribute.

18. A system comprising:

at least one processor to:

receive data records each containing plural attributes including first, second, and third attributes;

for plural categorical values of the first attribute, select more relevant categorical values of the second attribute from among candidate categorical values of the second attribute, wherein the selecting uses a relevance determination process that considers frequencies of occurrence of respective pairs of the categorical values of the first and second attributes; and generate a visualization screen that includes groups of cells corresponding to the respective pairs of categorical values of the first and second attributes, each of the cells corresponding to a pair of categorical values of the first and second attributes in a respective data record, wherein at least one of the groups includes cells assigned visual indicators based on values of the third attribute, wherein the generating of the visualization screen comprises placing cells sharing a given pair of a first categorical value of the first attribute and a second categorical value of the second attribute in a region corresponding to an intersection of the first categorical value and the second categorical value in the visualization screen, wherein the placing avoids overlaying of the placed cells.

19. The system of claim 18, wherein the at least one processor is to further categorize and sort the first attribute values and second attribute values.

20. The system of claim 18, wherein the at least one processor is to:

generate a feature vector data structure that relates the categorical values of the first attribute to the categorical values of the second attribute, wherein an entry of the feature vector data structure corresponding to a respective pair of a value of the first attribute and a value of the second attribute has a value based on the corresponding frequency of occurrence of the respective pair;

categorize rows or columns in the feature vector data structure into a plurality of classes; and order the rows or columns in the feature vector data structure according to numbers of events associated with the corresponding values of the first or second attribute.

* * * * *